United States Patent Office 3,700,645
Patented Oct. 24, 1972

3,700,645
PROCESS FOR PREPARING MERCAPTO-TERMINATED CHLOROPRENE COPOLYMERS
Ichiro Fukuoka and Satoshi Takahashi, Tokyo, and Norio Yagi, Kanagawa, Japan, assignors to Denki Kagaku Kogyo Kabushiki Kaisha, Tokyo, Japan
No Drawing. Filed Mar. 16, 1971, Ser. No. 124,929
Claims priority, application Japan, Mar. 18, 1970, 45/22,473, 45/22,474
Int. Cl. C08g 22/00
U.S. Cl. 260—77.5 CR        12 Claims

ABSTRACT OF THE DISCLOSURE

Mercapto-terminated chloroprene-copolymer is prepared by the steps of dissolving a mixture of chloroprene monomer and a comparatively large amount of sulfur into organic solvent, copolymerizing said mixture by the solution polymerization method, and cleaving the obtained copolymer by the action of nascent state hydrogen in the solution.

The obtained copolymer is liquid at ambient temperature and can be easily cured using ordinary curing agents.

BACKGROUND OF THE INVENTION

This invention relates to a chloroprene copolymer, and especially to a mercapto-terminated chloroprene copolymer, which is in a liquid state at normal temperature, and can be easily cured using ordinary curing agents.

U.S. Pat. 3,373,146 discloses a process for preparing a mercapto-terminated diene polymer, which comprises copolymerizing sulfur and a conjugated diene having 4 to 8 carbon atoms such as butadiene and isoprene, treating the resulting copolymer with a solvent so as to swell it, and further treating the thus swelled copolymer with metallic zinc and a non-oxidizing mineral acid. The cleaving process to treat a high polymer with metallic zinc and a non-oxidizing mineral acid is very effective for obtaining low molecular weight polymer therefrom. However, in order to obtain a cleaved polymer which is low enough in molecular weight that it is completely in the liquid state at room temperature, the polymer as the starting material must contain a considerable amount of sulfur atoms interspersed in its chain. Because, if the content of the sulfur combined in the polymer is low, the polymer cannot be cleaved to the extent that the resultant polymer is a liquid, even though the cleaving reaction is continued for a prolonged period.

In order to obtain a cleaved polymer, which is completely in the liquid state at normal temperature, by cleaving a copolymer of chloroprene and sulfur, the copolymer as the starting material must contain not less than 2% by weight of sulfur. In order to obtain a chloroprene-sulfur copolymer containing not less than 2% by weight of sulfur, not less than 5 parts by weight sulfur must be used per 100 parts by weight chloroprene monomer when the copolymer is prepared. When chloroprene and sulfur are copolymerized by emulsion polymerization, polymerization must be carried out with sulfur completely dissolved in chloroprene monomer. As the solubility of sulfur in chloroprene monomer is about 1% at the most, the sulfur content of the resulting copolymer is inevitably low. Such copolymer cannot be cleaved into a liquid product. Even if sulfur is added successively to the reaction mixture as the polymerization proceeds, the sulfur content of the produced copolymer is no more than 2%, and cleavage of this does not give a polymer having a molecular weight not more than 10,000. Therefore, in the case of chloroprene, a copolymer as the starting material which is in use for the cleavage cannot be obtained by the emulsion polymerization as in the case of butadiene or isoprenes, as disclosed in U.S. Pat. 3,373,146.

Furthermore, the copolymer obtained from the conjugated diene and sulfur in the process of U.S. Pat. 3,373,146 is a gel, and does not dissolve in solvent. Therefore, cleavage of the polymer is carried out in a swelled state. As the gel polymer does not uniformly dissolve in the solvent, the cleavage reaction does not proceed homogeneously and high cleaving efficiency is not obtained.

SUMMARY OF THE INVENTION

An object of the present invention is to provide a method for preparing mercapto-terminated chloroprene copolymers which are in liquid state at normal temperature.

Another object of the present invention is to prepare mercapto-terminated chloroprene copolymers which can be easily cured using ordinary curing agents.

These objects may be attained in accordance with this invention which comprises dissolving a copolymer obtained by the copolymerization of a comparatively large amount of sulfur with chloroprene in accordance with the solution polymerization process in a solvent, and cleaving the obtained copolymer by the action of nascent state hydrogen introduced in the solution.

Other important objects and advantageous features of the invention will be apparent from the following description, wherein specific embodiments of the invention are set forth in detail.

DETAILED DESCRIPTION OF THE INVENTION

In this description, all parts and percentages are by weight unless otherwise indicated.

This invention is essentially characterized in that a copolymerization of chloroprene and sulfur is carried out in solution. One hundred parts of chloroprene monomer or a mixture of chloroprene and any other copolymerizable monomer or monomers and 5 to 30 parts of sulfur are dissolved in 50 to 500 parts of a solvent, and the solution polymerization is carried out at a temperature of 10 to 100° C. using a free radical catalyst as the polymerization initiator. Any solvent in which both chloroprene monomer and sulfur dissolve can be used, and typical examples thereof include carbon disulfide, benzene, toluene, xylene, etc. At least 50 parts of the solvent must be used. If the amount of the used solvent is less than 50 parts, more than 5 parts sulfur does not dissolve therein, and furthermore, viscosity of the reaction mixture increases as polymerization proceeds and agitation of it becomes difficult, which results in non-uniform polymerization. Use of more than 500 parts of the solvent retards polymerization and is economically disadvantageous. Use of less than 5 parts of sulfur gives a copolymer containing less than 2% combined sulfur, and cleaving thereof does not bring about the liquid copolymer. If more than 30 parts of sulfur is used, the amount of the combined sulfur in the copolymer does not increase, and therefore the sulfur is wasted. At reaction temperatures lower than 10° C., the copolymerization reaction is too slow, while at temperatures higher than 100° C., the reaction is too rapid to control. Usually the preferred reaction temperature is 40 to 60° C. Polymerization is initiated with a free radical catalyst e.g. organic peroxides, azo compounds and catalysts of redox type. Typical examples thereof are benzoyl peroxide, isopropyl peroxide, $\alpha,\alpha'$-azo-bis-isobutyronitrile, $\alpha,\alpha'$-azo-bis-(2,4-dimethyl)valeronitrile, a redox compound consisting of benzoyl peroxide and diethylaniline, etc. These initiators are used singly or in combination. The amount of the catalyst to be used is in the range of 0.1 to 5.0 parts per 100 parts of chloroprene monomer. It is essential to stop the polymerization at the stage where the conversion of the monomers to the copolymer (hereinafter simply referred to as polymerization degree) has reached at most 80%. If the polymerization degree exceeds 80%, the produced copolymer will be a gel and this is inconvenient because it makes operations of the cleavage very difficult. Cessation of the polymerization is effected by addition of a known short-stop such as t-butyl catechol. Examples of the monomers which are copolymerizable with chloroprene are: aromatic vinyl compounds such as styrene, vinyl toluene; acrylic acid, methacrylic acid and their esters; nitriles such as acrylonitrile; conjugated dienes such as 1,3 butadiene, isoprene, 2,3-dichloro-1,3-butadiene; non-conjugated dienes such as divinyl benzene, ethylene glycol dimethacrylate, etc. The amount of the copolymerizable monomer to be used is limited to up to 10 percent of the combined weight of chloroprene and copolymerizable monomer. When more than 10 percent of such co-monomer is used, the resulting product no longer has characteristic properties of the chloroprene polymer.

The produced copolymer is a polymeric material that contains no gel ingredient, and dissolves in organic solvents. The content of the combined sulfur and molecular weight of the produced copolymer can be controlled by regulating the amount of sulfur to be added and the amount and kind of solvent to be used.

The thus produced organic-solvent-soluble copolymer can be cleaved into a liquid polymeric material by the action of a hydrogenolytic cleaving agent which produces nascent hydrogen. After the polymerization is ceased at the stage where the polymerization degree has reached at most 80%, the unreacted monomer and sulfur are removed and the cleaving reaction is started by adding the hydrogenolysis agent. The process of this invention is convenient in that the polymerization mixture can be directly used for the successive cleaving step. As the cleaving reaction is carried out in a homogeneous solution, the reaction efficiency thereof is high. In contrast, in the process of U.S. Pat. No. 3,373,146, the copolymer produced by emulsion polymerization is a gel and does not dissolve in solvent, and so it is necessary to swell the copolymer at the cleaving stage. Even though the copolymer is swelled, the resultant mixture is not homogeneous, so that the hydrogenolysis agent does not work efficiently.

In the process of this invention, a plurality of sulfur atoms combined in the chain of chloroprene-sulfur copolymer are reduced to mercapto groups by the action of the hydrogenolysis agent, and the remaining sulfur atoms are converted to hydrogen sulfide. Every sulfur atom contained in the liquid chloroprene polymer obtained by the cleaving reaction of this invention is bonded to the chain end in the form of mercapto group.

Copolymers of chloroprene and sulfur are generally inferior in storage stability. It is regarded that this instability is due to easy cleavage of the S—S bond contained in the copolymer, and its susceptibility to oxidation by atmospheric oxygen. In the product prepared by the method of this invention, not less than 98% of sulfur is in the form of mercapto group. In other words, proportion of the contained sulfur which is in the form of mercapto is nearly 100%, which means the degree of cleavage is nearly 100%. Therefore the liquid chloroprene polymer containing sulfur is satisfactorily stable in storage.

In the case of butadiene or isoprene copolymers, mercapto groups are liable to be added to double bonds, which results in poor stability in storage. Therefore, a large amount of phenolic or phosphoric stabilizers must be added to these copolymers for the purpose of preventing such poor stability. In the case of chloroprene polymers, the carbon atom of each double bond has a chlorine atom bonded thereto, which makes addition of mercapto group to the double bond very difficult.

In the cleavage of the process of this invention, any substance that produces hydrogen of the nascent state can be used as the hydrogenolysis agent. Such nascent hydrogen sources include combinations of a metal and a non-oxidizing mineral acid, e.g., a combination of zinc powder and hydrochloric acid is used. In this case, the solvent used in the stage of polymerization can conveniently be used in the stage of hydrogenolysis, if it is inert to the latter reaction. If the solvent is immiscible with water, addition of a small amount of a water-miscible solvent such as methanol, ethanol, isopropyl alcohol, methyl cellosolve, etc. will effect efficient utilization of nascent hydrogen radicals. The amount of metal powder to be used depends upon the amount of hydrogen radicals expected to evolve. Hydrogen radicals in an amount of at least twice the amount of sulfur in equivalent weight are required. That is, if zinc is used for instance, the amount thereof is to be at least equivalent to that of the combined sulfur. The amount of the non-oxidizing mineral acid to be used must be 1.0 to 1.5 times that of the metal in equivalent weight. The acid in an amount less than equivalent will leave unreacted metal, whereas acid in more than 1.5 times is unnecessary. The reaction temperature should preferably be as low as possible, since hydrogen radicals can be effectively utilized at low temperatures. However, a suitable temperature may be selected by considering velocity of reaction between the metal and the mineral acid and the one between sulfur and hydrogen radicals. Preferred temperatures are in the range of 10 to 80° C.

In the cleavage of the process of this invention, alkali aluminum hydride such as LiAlH$_4$ may be used. When such a hydride is used, the reaction must be carried out in an anhydrous medium in the absence of any compound having active hydrogen such as an alcohol or an acid.

When the cleaving process is carried out in accordance with this invention, the copolymer solution should contain the copolymer in the concentration of 5 to 50%, preferably 10 to 30%. Employment of a concentration not more than 5% requires a large reaction vessel and retards the reaction. A concentration higher than 50% gives a viscous solution, from which homogeneous reaction is no longer expected. The concentration of polymer solution is adjusted to the above mentioned range after the polymerization has ceased, and the unreacted monomer and sulfur are removed. When the solution is diluted for the purpose of adjustment of concentration, any solvent which can be used for the copolymerization as explained above can be used. But the same solvent as has been used for the preceding copolymerization is preferred.

The thus obtained liquid chloroprene polymeric material is easily cured by the reaction with a curing agent at normal temperature or comparatively low temperatures, whereby a chain is extended, and at the same time a network is formed by cross-linking, entanglement of the molecules or the cohesive force of chlorine atoms so as to give an insoluble elastomer. As the curing agent, a metal peroxide, an organic peroxide, an organometallic oxide, an epoxy compound or an isocyanate compound is used alone or in combination. The specific examples of these compounds are: lead peroxide, a calcium peroxide, barium peroxide, manganese dioxide for a metal peroxide; cumene hydroperoxide, benzoyl peroxide, etc. for an organic peroxide; and dibutyl tin oxide, dipropyl tin oxide for an organometallic oxide. As to the epoxy compound and the isocyanate compound, any multifunctional compound that contains at least 2 epoxy or isocyanate groups in its molecule and dissolves in or is miscible with the liquid chloroprene polymer. The preferred epoxy compounds are comparatively low molecular liquid compounds, examples of which are "Epikote 828," which is a glycidyl type epoxy resin, "Epikote 154," which is a novolak type epoxy resin (both are trade names by Shell International Chemicals Corp.). Examples of the preferred isocyanate compounds are: 2,4- or 2,6 - toluenediisocyanate, diphenylmethane - 4,1' - diisocyanate, etc. The amount of the curing agent to be used is 0.5 to 3 equivalents, preferably 0.5 to 1.2 equivalents to the existing mercapto groups. A curing agent less than 0.5 equivalent does not cure satisfactorily, while more than 3 equivalents is impractical since the physical properties such as tensile strength, elongation, etc. of the produced elastomer are reduced, and stability thereof decreases, too.

When the above-mentioned metal peroxide and/or organic peroxide is used as the curing agent, and if a more rapid curing is desired an amine curing accelerator is preferably used in combination with said peroxide. Examples of such amine curing accelerators are: aliphatic amines such as triethyl amine, ethylene diamine, hexamethylene diamine, diethylene triamine, or triethylene tetramine; alicyclic amines such as cyclohexyl amine, or dicyclohexylamine; aromatic amines such as phenylene diamine, or N-methylaniline; heterocyclic amines such as piperidine, pyridine, pyrol, triethanol amine or N-methyl diethanol amine. The amount of amine to be used depends on the kind of the curing agent. For instance, when a comparatively rapid curing agent such as lead peroxide is used, a small amount of the accelerator suffices. When a comparatively slow curing agent such as cumene hydroperoxide is used, a larger amount of the amine is required. However, use of too large amount of such accelerator is undesirable because it partly acts as a plasticizer. Therefore, the usual amount of the curing accelerator to be used is 0.01 to 5 parts, preferably 0.05 to 2.0 parts, per 100 parts of the liquid chloroprene polymer. When the amount is less than the above-defined, curing takes too long. When more than the above-defined is used curing is too rapid to be practical.

This cured product obtained in accordance with the invention is a rubber-like elastomer provided with excellent elasticity, adhesiveness, aging resistance, chemical resistance and oil resistance. Therefore, it is useful as a base for sealants, high solid adhesives and coatings, and also as a curable plasticizer for dry polymers or other wide uses. In particular, the cured product is self-extinguishing, and so it is preferred as an elastic sealing material of solventless type. The cured polymer obtained by using an epoxy compound or an isocyanate compound possesses characteristic properties of the epoxy compound or the isocyanate compound combined with those of the chloroprene polymer.

EXAMPLES

The process of the present invention will be more fully understood by reference to the following examples. As mentioned before, all parts and percentages are by weight unless otherwise indicated.

PREPARATION OF SULFUR-CONTAINING CHLOROPRENE COPOLYMERS

Example 1

One hundred parts monomeric chloroprene, 200 parts of benzene and 15 parts of sulfur were charged in a reaction vessel, the inside space of which had been thoroughly replaced with nitrogen. One part of $\alpha,\alpha'$-azo-bis (2,4-dimethyl) valeronitryl as the catalyst was added to the mixture and the mixture was held at a temperature of 55° C. for 24 hours for polymerization. Thereafter 0.05 part of tertiary butyl catechol was added so as to stop the polymerization and the unreacted chloroprene monomer was removed by distillation under a reduced pressure. Further the remaining sulfur was removed by treating the reaction mixture with a 10% sodium hydroxide solution containing sodium hydroxide in an amount equimolar with the amount of the initial charge of sulfur. A sulfur containing copolymer was obtained with a conversion degree of 60.5%. The sulfur content of the product was 5.4% and the intrinsic viscosity $(n)$ in toluene thereof at 30° C. was 0.205. The copolymer was completely soluble in toluene.

Examples 2 to 13

Using various solvents in various amounts, sulfur in various amounts, various polymerization initiators in various amounts, and various monomers copolymerizable with chloroprene as shown in Table 1, copolymers, which contain more than 2% copolymerized sulfur and are completely soluble, were respectively prepared pursuant to the operation of Example 1. The results are summarized in Table 1.

TABLE 1

| Example No. | Amount of used monomer (part) | | Sulfur | Solvent | | Initiator | |
| | Chloroprene | Monomer copolymerizable with chloroprene | | Substance | Amount (part) | Substance | Amount (part) |
| --- | --- | --- | --- | --- | --- | --- | --- |
| 2 | 100 | | 7.5 | Benzene | 300 | Benzoylperoxide | 1.0 |
| 3 | 100 | | 5 | do | 300 | do | 1.0 |
| 4 | 100 | | 20 | do | 300 | do | 1.0 |
| 5 | 100 | | 15 | Toluene | 200 | $\alpha,\alpha'$-azobis (2,4-dimethyl) valeronitryl | 1.0 |
| 6 | 100 | | 10 | Carbon disulfide | 100 | Benzoylperoxide | 1.0 |
| 7 | 100 | | 15 | Benzene | 200 | $\alpha,\alpha'$-azobis (2,4-dimethyl) valeronitryl | 0.5 |
| 8 | 100 | | 15 | do | 200 | do | 2.0 |
| 9 | 100 | | 15 | do | 200 | {benzoylperoxide / Diethylaniline} | 0.5 / 0.5 |
| 10 | 100 | | 15 | do | 200 | $\alpha,\alpha'$-azobis (2,4-dimethyl) valeronitryl | 1.0 |
| 11 | 95 | ¹ 5 | 15 | do | 200 | do | 1.0 |
| 12 | 95 | ² 5 | 15 | do | 200 | do | 1.0 |
| 13 | 95 | ³ 5 | 15 | do | 200 | do | 1.0 |
| Comparative Example 1 | 100 | | 15 | do | 200 | do | 1.0 |
| Comparative Example 2 | 100 | | ⁴ 10 | Aqueous emulsion polymerization | | Potassium persulfate | 1.0 |

TABLE 1—Continued

| | | | Chloroprene-sulfur copolymer | | | |
|---|---|---|---|---|---|---|
| Example No. | Polymerization temperature (° C.) | Polymerization time (hour) | Copolymerized sulfur (percent) | Polymerization degree (percent) | $[\eta]$ 30° C. toluene | Solubility to toluene |
| 2 | 55 | 42 | 2.60 | 42.5 | 0.402 | Perfectly soluble. |
| 3 | 55 | 42 | 4.81 | 38.5 | 0.372 | Do. |
| 4 | 55 | 42 | 5.13 | 37.2 | 0.356 | Do. |
| 5 | 55 | 24 | 4.64 | 60.0 | 0.200 | Do. |
| 6 | 50 | 24 | 6.50 | 57.5 | 0.635 | Do. |
| 7 | 55 | 24 | 4.90 | 43.2 | 0.316 | Do. |
| 8 | 55 | 24 | 6.12 | 77.4 | 0.211 | Do. |
| 9 | 55 | 42 | 4.11 | 39.9 | 0.400 | Do. |
| 10 | 40 | 24 | 4.50 | 42.5 | 0.286 | Do. |
| 11 | 55 | 24 | 5.74 | 58.2 | 0.224 | Do. |
| 12 | 55 | 24 | 5.32 | 60.7 | 0.724 | Do. |
| 13 | 55 | 24 | 4.53 | 48.5 | 0.815 | Do. |
| Comparative Example 1 | 55 | 48 | 4.60 | 88.9 | Gel state | 20% to full soluble property. |
| Comparative Example 2 | 40 | 24 | 1.00 | 65.8 | do | Non-soluble. |

[1] Styrene.
[2] 2,3-dichlorobutadiene-1,3.
[3] Ethyleneglycoldimethacrylate.
[4] Added by three times.

Comparative Examples 1 and 2

Table 1 includes conditions and results of Comparative Examples 1 and 2, too.

CLEAVAGE OF THE SULFUR CONTAINING COPOLYMERS

Example 14

To the sulfur-containing chloroprene copolymer solution obtained in Example 1, benzene, which is a solvent used at the stage of polymerization, was added so as to prepare a 15% solution of said copolymer. Thirty parts of isopropyl alcohol per 100 parts of said copolymer were admixed with this solution. To the resultant solution 75 parts of zinc powder, which correspond to 6.8 equivalent weight of the copolymerized sulfur, was added at 40° C. under vigorous agitation, and then 375 parts of 36% aqueous hydrochloric acid solution were added at the rate of 7.0 parts per hour so as to allow cleavage of the copolymer. After 7 hours reaction the agitation was ceased, whereby all of the zinc powder reacted and turned white. After the vessel was let stand still, the upper layer was separated and washed with water until the water after washing became neutral. Thereafter the solvent, benzene, was distilled off under a reduced pressure, and the resultant product was dried in a high vacuum. The obtained product was a liquid at 25° C. and the viscosity thereof was 9,000 cps. at 30° C. A quantitative analysis of the mercapto group by means of potentiometric titration using a 0.025 N AgNO$_3$-isopropyl alcohol solution showed that the copolymer contained 3.12% (as sulfur) of mercapto group. When the sulfur content was directly determined, it was 3.15%. This means that the proportion of the mercapto sulfur to the total sulfur content, which corresponds to the degree of cleavage is 99.04%. The molecular weight of the cleaved copolymer, which was calculated from the mercapto group content, was 2058.

Examples 15 to 26

The chloroprene copolymers prepared in Examples 2 to 13 were cleaved in the same way as in Example 14. The results are shown in Table 2. In very product, substantially whole of the contained sulfur was in the form of mercapto group. All the products were liquid at room temperature.

TABLE 2

| | Chloroprene copolymer | | | Liquid chloroprene copolymer | | | | | |
|---|---|---|---|---|---|---|---|---|---|
| Example No. | Copolymerized sulfur, percent | $[\eta]$ 30° C. toluene | Solubility toluene | Sulfur as mercaptan, percent | Total sulfur, percent | Cleaving degree, percent | Solution viscosity, cps. 30° C. | Average molecular weight | The state at 25° C. |
| 15 | 2.60 | 0.402 | Perfectly soluble | 1.44 | 1.44 | 100 | 210,000 | 4,440 | Perfectly liquid. |
| 16 | 4.81 | 0.372 | do | 2.79 | 2.81 | 99.3 | 25,000 | 2,300 | Do. |
| 17 | 5.13 | 0.356 | do | 2.91 | 2.92 | 99.7 | 21,500 | 2,200 | Do. |
| 18 | 4.64 | 0.200 | do | 2.64 | 2.64 | 100 | 13,200 | 2,430 | Do. |
| 19 | 6.50 | 0.635 | do | 4.80 | 4.83 | 99.4 | 5,000 | 1,330 | Do. |
| 20 | 4.90 | 0.315 | do | 2.79 | 2.81 | 99.3 | 10,000 | 2,300 | Do. |
| 21 | 6.12 | 0.211 | do | 3.49 | 3.51 | 99.4 | 8,500 | 1,840 | Do. |
| 22 | 4.11 | 0.400 | do | 2.34 | 2.34 | 100 | 15,000 | 2,730 | Do. |
| 23 | 4.50 | 0.286 | do | 3.28 | 3.28 | 100 | 9,000 | 1,950 | Do. |
| 24 [1] | 5.74 | 0.224 | do | 2.25 | 2.26 | 99.6 | 15,500 | 2,850 | Do. |
| 25 [2] | 5.32 | 0.724 | do | 2.77 | 2.79 | 99.3 | 18,400 | 2,310 | Do. |
| 26 [3] | 4.53 | 0.815 | do | 2.32 | 2.32 | 100 | 26,800 | 2,760 | Do. |
| Comparative Example 3 | 4.60 | Gel state | 20% | 1.06 | 4.01 | 26.4 | [4] | 6,042 | Solid. |
| Comparative Example 4 | 1.00 | do | Non-soluble | <0.32 | 0.52 | 61.5 | | >20,000 | Do. |

[1] Styrene/chloroprene monomer=5/95.
[2] 2,3-dichlorobutadiene-1,3/chloroprene monomer=5/95.
[3] Ethyleneglycol-dimethacrylate/chloroprene monomer=5/95.
[4] Fluid state at 70° C.

Comparative Example 3

The chloroprene copolymer in the gel form in Comparative Example 1 was swelled with benzene, and the swelled copolymer was cleaved in accordance with the process of Example 14. The results are included in Table 2. The copolymer could not be cleaved to the extent that the product is liquid at normal temperature, as seen in Table 2.

Comparative Example 4

The chloroprene copolymer obtained by emulsion polymerization in Comparative Example 2 was cleaved in the same way as above, and the results are incorporated in Table 2, too. As seen in the table, no liquid chloroprene polymer was obtained from the gel copolymer prepared by emulsion polymerization.

Comparative Example 5

The chloroprene copolymer obtained in Example 1 was cleaved in the same way as in Example 14 except that concentration of the copolymer in benzene was varied. The results are shown in Table 3. The table shows that cleavage is insufficient at lower concentration, and the degree of cleavage is lowered at high concentration, too. It is regarded that the reason for the latter is that high viscosity in high concentration makes the agitation difficult, and inhomogeneous reaction takes place as the result.

TABLE 3

| Concentration (percent) | Cleavage time (hr). | Degree of cleavage (percent) |
|---|---|---|
| 3 | 7 | 56.18 |
| 5 | 7 | 98.65 |
| 50 | 7 | 99.21 |
| 60 | 7 | 70.26 |

Example 27

The soluble chloroprene copolymer obtained in Example 1 was cleaved in the same way as in Example 14 except that zinc was used in an amount of 2.5 equivalents of the copolymerized sulfur. It is judged from the proportion of the mercaptan sulfur that the copolymer was thoroughly cleaved. The product exhibited the same melt viscosity as the product of Example 14.

Comparative Example 6

A butadiene-sulfur copolymer was prepared and cleaved by the known method. The copolymer was a gel insoluble in benzene and toluene, and the copolymerized sulfur content thereof was 5.0%. The copolymer was swelled with benzene, and the cleavage was carried out using zinc powder in an amount of 2.5 equivalents of the amount of the copolymerized sulfur under the same conditions with respect to the rate of dropwise addition of hydrochloric acid, etc. The results are shown in Table 3. The butadiene-sulfur copolymer was not satisfactorily cleaved to give a liquid cleaved product.

STORAGE STABILITY OF THE LIQUID CHLOROPRENE COPOLYMER

Example 28

The copolymer of the chloroprene copolymer obtained in Example 1 was treated under the same conditions as in Example 14, but samples being taken now and then in the course of the reaction, and was subjected to the same after-treatment. Thus products of varied degrees of cleavage were obtained. Storage stability of the products was tested by placing samples thereof, in a forced air drying oven kept at 35° C. and checking the viscosity of the sample at predetermined intervals. The results are shown in Table 5.

TABLE 5

| | Properties of liquid copolymer | | | | Change of viscosity (cps. increasing at 35° C.) after— | | | | | |
|---|---|---|---|---|---|---|---|---|---|---|
| Sample No. | Sulfur as mercaptan, percent | Total sulfur, percent | Cleaving degree, percent | Solution viscosity, cps. 35° C. | 3 days | 7 days | 14 days | 28 days | 42 days | 70 days |
| Chloroprene copolymer: | | | | | | | | | | |
| 1 | 3.12 | 3.15 | 99.03 | 9,000 | 0 | 0 | 0 | 0 | 100 | 100 |
| 2 | 2.70 | 3.35 | 80.60 | 18,500 | 6,500 | 10,000 | 11,500 | 64,000 | 354,000 | 507,500 |
| 3 | 2.02 | 4.12 | 49.02 | 36,000 | 34,000 | 59,000 | 229,000 | 814,000 | 1,220,000 | 1,464,000 |
| Butadiene copolymer: | | | | | | | | | | |
| 4 | 2.85 | 2.86 | 99.65 | 8,400 | 600 | 1,100 | 1,500 | 2,000 | 7,500 | 13,000 |
| 5 | 2.85 | 2.86 | 99.65 | 8,400 | 0 | 0 | 100 | 150 | 150 | 200 |

[1] As the stabilizer (2,2'-methylenebis (4 methyl-6-tertiary butyl) phenol, 2 parts trinonylphenylphosphite, 1 part) were contained.

Example 29

To 100 parts of the liquid chloroprene copolymer obtained in Example 14, 30 parts SRF carbons, 5 parts magnesia, 5 parts zinc white and 10 parts lead peroxide as the curing agent were admixed well at 30° C. The mixture was put in a glass cylinder 15 mm. in diameter and 40 mm. in height placed in a constant moistured thermostat kept at 30° C. with 45 to 50% humidity so that the content of the cylinder was cured. The curing velocity was determined by measuring the hardness of the sample with a penetrometer. It was revealed that the pot life of the copolymer was 1 hour and half. Also the liquid copolymer was cast into a sheet form and was cured at 30° C. for 2 weeks. Physical properties of the cured material were measured. The physical properties of the obtained rubbery elastomer were: breaking tensile strength 35.4 kg./cm.$^2$, elongation 280%, 100% modulus 17.6 kg./cm.$^2$ and hardness 52.

TABLE 4

| | Amount of copolymerized sulfur | Solubility in benzene | Properties of cleaved copolymer | | | |
|---|---|---|---|---|---|---|
| | | | Sulfur as mercaptan, percent | Total sulfur, percent | Cleaving degree,[1] percent | Solution viscosity, cps. 30° C. |
| Chloroprene copolymer (from Example 1) | 5.4 | Perfectly soluble | 3.12 | 3.15 | 99.04 | 9,000 |
| Butadiene-sulfur copolymer | 5.0 | Gel state | 1.98 | 4.20 | 47.15 | Solid. |

[1] Cleaving degree means percentages of mercapto-sulfur on the basis of total sulfor

Examples 30 to 36

Curing of the liquid copolymer was carried out using various kinds of peroxide, epoxy compound, or isocyanate singly or in combination, and rubbery elastomers were obtained. The results are shown in Table 6.

TABLE 6

| | Curing agent | | Curing condition | | Curing velocity (pot-life) | | Physical properties of cured substance | | | |
|---|---|---|---|---|---|---|---|---|---|---|
| Example No. | Substance | Amount (part) | Temperature (° C.) | Humidity (percent) | Hours | Minutes | Tensile strength (kg./cm.²) | Elongation (percent) | 100% modulus (kg./cm.²) | Hardness |
| 30 | Manganese dioxide | 10 | 30 | 45-50 | 1 | 15 | 36.1 | 265 | 20.8 | 52 |
| 31 | Calcium peroxide | 7.5 | 30 | 45-50 | 1 | 00 | 38.4 | 240 | 23.0 | 52 |
| 32 | Cumenhydroperoxide | 10 | 30 | 45-50 | 25 | 40 | 21.5 | 380 | 8.2 | 40 |
| 33 | Epikote 154 | 10 | 30 | 45-50 | 120 | 00 | 15.4 | 365 | 4.8 | 40 |
| 34 | 2,4-toluene-diisocyanate | 10 | 30 | 45-50 | 0 | 30 | 40.0 | 200 | 28.7 | 54 |
| 35 | {Lead peroxide / Epikote 154} | {7.5 / 2.5} | 30 | 45-50 | 2 | 15 | 33.5 | 280 | 17.8 | 65 |
| 36 | {Lead peroxide / 2,4-toluene-diisocyanate} | {7.5 / 2.5} | 30 | 45-50 | 1 | 30 | 36.2 | 250 | 21.4 | 56 |

Example 37

To 100 parts of the liquid chloroprene copolymer obtained in Example 14, 30 parts SRF carbon, 5 parts magnesia, 5 parts zinc white and 0.5 part triethylene tetramine as the curing agent were admixed well at 30° C. The mixture was put in a glass cylinder 15 mm. in diameter and 40 mm. in height, and the cylinder was placed in a constant moistured thermostat kept at 30° C. with 45 to 50% humidity so that the content of the cylinder was cured. The curing velocity was measured by a penetrometer, and the results told that the pot life thereof was 15 minutes.

The mixture was cast into a sheet form 2 mm. in thickness, and was cured at 30° C. for 2 weeks. The physical properties of the cured material were measured. The results were: breaking tensile strength 35.8 kg./cm.$^2$, elongation 250%, 100% modulus 12.1 kg./cm.$^2$, hardness 52.

Examples 38 to 48

Curing of the liquid copolymer obtained in Example 14 was carried out using various species of amine curing agent in varied amounts in accordance with the process of Example 37. Curing velocity and physical properties of each cured product were measured, and the results were shown in Table 7.

TABLE 7

| | Curing agent | | Amines | | Curing velocity (pot-life) | | Properties of rubbery elastomer | | | |
|---|---|---|---|---|---|---|---|---|---|---|
| Example No. | Substance | Amount (part) | Substance | Amount (part) | Hours | Minutes | Tensile strength (kg./cm.$^2$) | Elongation (percent) | 100% modulus (kg./cm.$^2$) | Hardness |
| 38 | Lead peroxide | 10 | Triethylene-tetramine. | 0.1 | 1 | 15 | 35.0 | 300 | 10.5 | 50 |
| 39 | do | 10 | do | 2.0 | <10 | | 39.7 | 250 | 12.1 | 50 |
| 40 | do | 10 | Triethylamine | 0.5 | 0 | 30 | 30.2 | 310 | 8.9 | 47 |
| 41 | do | 10 | Hexamethylene diamine. | 0.5 | 0 | 18 | 31.5 | 280 | 10.4 | 50 |
| 42 | do | 10 | Piperazine | 0.5 | 0 | 15 | 33.1 | 260 | 13.5 | 51 |
| 43 | do | 10 | Pyridine | 0.5 | 0 | 10 | 35.8 | 280 | 11.2 | 52 |
| 44 | Manganese dioxide | 10 | Triethylene-tetramine. | 0.5 | 0 | 15 | 36.5 | 240 | 15.1 | 54 |
| 45 | Cumenhydroperoxide | 10 | do | 0.5 | 2 | 15 | 29.6 | 300 | 8.1 | 43 |
| 46 | Lead peroxide | 10 | Cyclohexylamine | 0.5 | 0 | 45 | 32.7 | 290 | 13.2 | 53 |
| 47 | do | 10 | N-methylaniline | 0.5 | 1 | 00 | 29.4 | 300 | 9.8 | 55 |
| 48 | do | 10 | Triethanolamine | 0.5 | 0 | 15 | 34.3 | 280 | 13.4 | 54 |

What we claim is:

1. A process for preparing mercapto-terminated chloroprene copolymer which comprises:
   (1) providing a solution of 100 parts chloroprene monomer, 0 to 10 parts other monomer copolymerizable with chloroprene and 5 to 30 parts of sulfur in 50 to 500 parts of organic solvent,
   (2) copolymerizing said monomers and sulfur in said solution in the presence of a free-radical catalyst at a temperature between about 10° to 100° C.,
   (3) terminating said copolymerization where conversion of the monomers to the copolymer has reached at most 80 percent,
   (4) removing unreacted monomer and sulfur from the solution resulting from step (3),
   (5) adjusting the concentration of the solution obtained in step (4) to contain 5 to 50 percent of copolymer produced by step (2), and
   (6) cleaving the copolymer in the solution by reaction with nascent hydrogen at a temperature between about 10° to 80° C. to produce a mercapto-terminated chloroprene polymer that is liquid at normal temperature.

2. The process according to claim 1 wherein the copolymerizable monomer in the step (1) is the one selected from the group consisting of styrene, 2,3-dichlorobutadiene-1,3 and ethyleneglycoldimethacrylate.

3. The process according to claim 1 wherein the organic solvent in the step (1) is the one selected from the group consisting of benzene, carbon disulfide and toluene.

4. The process according to claim 1 wherein the free radical catalyst in the step (1) is the one selected from the group consisting of α,α'-azobis (2,4-dimethylvaleronitrile), benzoyl peroxide and a combination of benzoyl peroxide and dimethylaniline.

5. Liquid mercapto-terminated chloroprene low copolymer prepared by the process according to claim 1.

6. The method of claim 1 wherein said nascent hydrogen is obtained from presence in said solution of lithium aluminum hydride.

7. The method of claim 1 wherein said nascent hydrogen is obtained by the combination of a metal and a non-oxidizing mineral acid.

8. The method of claim 7 wherein said metal and acid are metallic zinc and hydrochloric acid respectively.

9. The method of claim 1 wherein a small amount of water-miscible solvent is added to said solution in step (5).

10. Elastomeric chloroprene polymer prepared by curing liquid mercapto-terminated chloroprene polymer, obtained by the method of claim 1 with a curing agent selected from the group consisting of metal peroxides, organic peroxides, organometallic oxides, epoxy compounds and isocyanate compounds used in an amount of from about 0.5 to 3 equivalents to the mercapto group content of said liquid mercapto-terminated chloroprene polymer.

11. Elastomeric chloroprene polymer of claim 10 wherein said curing of said liquid polymer is in the presence of an amine curing accelerator selected from the group consisting of aliphatic amines, alicyclic amines and heterocyclic amines, the amount of said accelerator being between about 0.05 to 2.0 parts for each 100 parts of said liquid polymer.

12. The method of claim 1 wherein said monomer copolymerizable with chloroprene is selected from the group consisting of aromatic vinyl compounds, acrylic acid and esters thereof, methacrylic acid and esters thereof, acrylonitrile, conjugated dienes and non-conjugated dienes.

References Cited

UNITED STATES PATENTS

| 3,338,875 | 8/1967 | Constanza et al. | 260—79 |
| 3,373,146 | 3/1968 | Meyer et al. | 260—79.7 |
| 3,413,265 | 11/1968 | Bertozzi | 260—46.5 |

DONALD E. CZAJA, Primary Examiner

M. I. MARQUIS, Assistant Examiner

U.S. Cl. X.R.

260—29.7 H, 29.7 SO, 29.7 AT, 77.5 AP, 79, 92.3, 837 R